(12) United States Patent
Nagarajan et al.

(10) Patent No.: US 11,581,992 B2
(45) Date of Patent: Feb. 14, 2023

(54) SYSTEMS AND METHODS FOR SIMULTANEOUS TRANSMISSION AND RECEPTION OF DIFFERENT RADIO ACCESS TECHNOLOGIES USING UNIFIED HARDWARE

(71) Applicant: EdgeQ, Inc., Santa Clara, CA (US)

(72) Inventors: Vinoth Nagarajan, Bangalore (IN); Sriram Rajagopal, Karnataka (IN)

(73) Assignee: EdgeQ, Inc., Santa Clara, CA (US)

( * ) Notice: Subject to any disclaimer, the term of this patent is extended or adjusted under 35 U.S.C. 154(b) by 0 days.

(21) Appl. No.: 17/368,604

(22) Filed: Jul. 6, 2021

(65) Prior Publication Data

US 2023/0008383 A1    Jan. 12, 2023

(51) Int. Cl.
*H04L 5/00*       (2006.01)
*H04W 72/04*   (2009.01)
*H04W 72/0453* (2023.01)

(52) U.S. Cl.
CPC .......... *H04L 5/0032* (2013.01); *H04L 5/0046* (2013.01); *H04L 5/0066* (2013.01); *H04W 72/0453* (2013.01)

(58) Field of Classification Search
None
See application file for complete search history.

(56) References Cited

U.S. PATENT DOCUMENTS

| 2010/0091688 | A1 | 4/2010 | Staszewski et al. |
| 2010/0177760 | A1 | 7/2010 | Cannon et al. |
| 2018/0049143 | A1 | 2/2018 | Gupta et al. |
| 2018/0063031 | A1 | 3/2018 | Wloczysiak et al. |
| 2019/0124648 | A1 | 4/2019 | Sun et al. |
| 2020/0067459 | A1* | 2/2020 | Ahmed ............. H01L 23/49811 |
| 2022/0200750 | A1* | 6/2022 | Sagazio ................. H04W 72/08 |

FOREIGN PATENT DOCUMENTS

WO    WO-2021257974 A1 * 12/2021  ............. H04L 29/08

OTHER PUBLICATIONS

International Search Report and Written Opinion in the related PCT application No. PCT/US22/29070, (13 pgs).

* cited by examiner

*Primary Examiner* — Peter Chen
*Assistant Examiner* — Jeff Banthrongsack
(74) *Attorney, Agent, or Firm* — North Weber & Baugh LLP; Michael North

(57) ABSTRACT

With advanced compute capabilities and growing convergence of wireless standards, it is desirable to run multiple wireless standards, e.g., 4G, 5G NR, and Wi-Fi, on a single signal processing system, e.g., a system on a chip (SoC). Such an implementation may require simultaneously receiving and transmitting signals corresponding to each wireless standard and also signal processing according to respective requirements. Typical solutions involve providing separate hardware blocks specific to each wireless standard, which in turn requires more area on the SoC and consumes more power. Embodiments of the present disclosure provide a unified hardware that may process signals across different standards in both a transmitting direction and a receiving direction simultaneously.

19 Claims, 14 Drawing Sheets

SYSTEMS AND METHODS FOR SIMULTANEOUS TRANSMISSION AND RECEPTION OF DIFFERENT RADIO ACCESS TECHNOLOGIES USING UNIFIED HARDWARE

TECHNICAL FIELD

The present disclosure relates generally to a unified wireless architecture that allows implementing different radio access technologies. More particularly, the present disclosure relates to architecture for simultaneous transmission and reception of different radio access technologies using unified hardware.

BACKGROUND

The importance of wireless communication in today's society is well understood by one of skill in the art. Advances in wireless technologies have resulted in the ability of a communication system to support wireless communications of different standards, e.g., 5G New Radio (NR), 4G LTE, Wi-Fi, etc. Different wireless standards have aspects which are very different from each other—fundamental frame structures, timing of symbols, forward error correction (FEC) codes.

Wireless nodes, such as cellular base stations and Wi-Fi access points, service wireless devices within a geographical cell or network. These geographical locations often overlap such that different types of wireless connections may be present within close proximity to each other (although operating at different frequencies). Recently, wireless communication systems have begun to converge to allow a wireless device to connect across a variety of different types of wireless networks. Implementing specialized hardware to process each standard results in large and complex hardware, lowers power efficiency for operation, and drives up the cost of the of the whole system.

With advanced compute capabilities and growing convergence of wireless standards, there is requirement to run multiple wireless standards, e.g., 4G LTE, 5G NR, and Wi-Fi, on a single hardware, e.g., a system on a chip (SoC). This requires simultaneously receiving and transmitting signals corresponding to each radio standard and also process them according to the requirements of the corresponding radio standard. However, typical solutions involve providing separate hardware blocks specific to each radio standard which in turn requires more area on the SoC and consumes more power. As the need for inter-operability among different types of wireless standards increases, improvements in resource flexibility and system configurability will become more important.

Accordingly, what is needed are systems, devices and methods that address the above-described issues.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
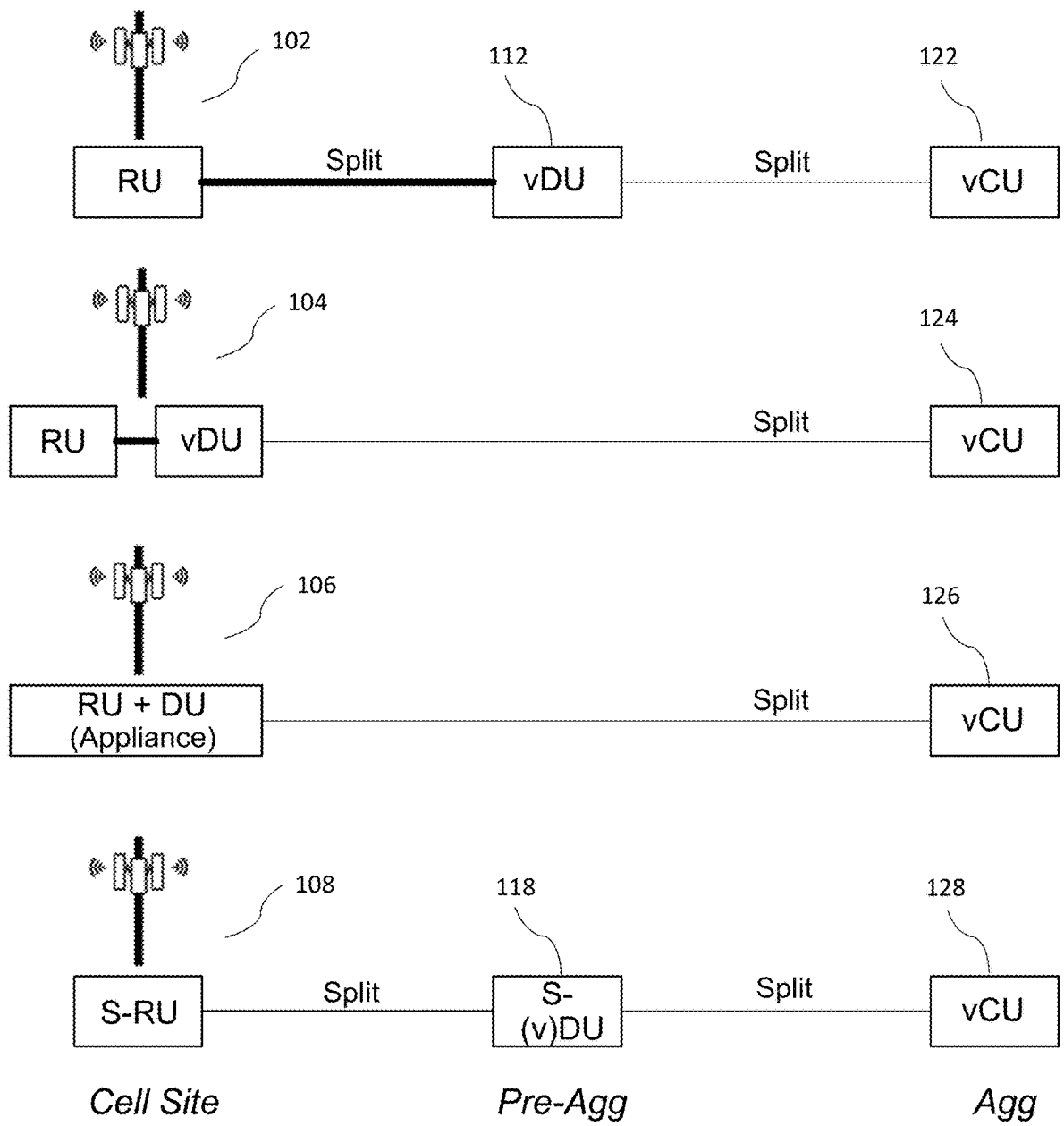
FIG. 1 ("FIG. 1") depicts various open radio access network (RAN) deployments for a telecommunication service provider, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Open RAN Deployment Models

A radio access network (RAN) is part of a telecommunication system. It implements a RAT to provide connection between a device, e.g., a mobile phone, and a core network (CN). Open RAN is an approach based on interoperability and standardization of RAN elements including a unified interconnection standard for white-box hardware and open source software elements from different vendors.

FIG. 1 depicts various open radio access network (RAN) deployments for a telecommunication service provider, according to embodiments of the present disclosure. As shown in FIG. 1, a radio unit (RU) 102 may couple to a virtual distribution unit (vDU) 112 with a split, e.g., ORAN 7-2 split, which is a Low PHY/High PHY split for ultra-reliable low-latency communication (URLLC) and near-edge deployment. The vDU 112 then couples to a virtual central unit (vCU) 122 with a split, e.g., split 2, which is referred as radio resource control and packet data convergence control split from the Layer 2 radio link control (RLC). Alternatively, a vDU may be deployed on the side of an RU 104, and then couples to a vCU 124 with a split, e.g., split 2. Alternatively, a distribution unit (DU) and an RU may be integrated as an appliance 106, which then couples to a vCU 126 with a split, e.g., split 2. Alternatively, a RU may be a small cell RN (S-RU) 108 couples to a small cell DU or vDU (S-vDU) 118 using a split, e.g., a MAC/PHY layer split (split 6). The S-vDU 118 then couple to a vCU 128 with a split, e.g., split 2.

A service provider (SP) may adopt more than one Open RAN deployment models based on band, fronthaul bandwidth requirements, or deployment type (macro/small cell), etc. Deployment models are influenced or decided based on multiple factors, including Fibre availability, real-estate/site/location constraints at pre-aggregation (Pre-Agg) and cell sites, total cost of ownership (TCO), Operational preference, etc. It is desirable for SPs to achieve maximum consistency around architecture, systems and operational model across all these deployment models.

With constant development of Wi-Fi technology, Wi-Fi access points (APs), especially 5G Wi-Fi APs, may transmit or receive signals at a frequency (e.g., 2.4 GHz, 5 GHz, or 6 GHz) within the frequency range 1 (FR1) for 5G communication. An RU serving 5G communications may also be configured for transmitting or receiving 5G Wi-Fi signals. Accordingly, a 5G station or a 5G femtocell may be deployed to serve both 5G and Wi-Fi communications. However, using specialized or separate hardware to separately process the 5G and Wi-Fi standards would result in complex hardware, increase power consumption for operation, and drive up the cost of the of the whole system. It would be desirable to have a unified or at least partially unified hardware that may be configured for simultaneous transmission and reception of different radio access technologies, including Wi-Fi.

B. Embodiments of Simultaneous Operation of Different RATs

A transmitting and receiving chain of a multi-RAT SoC needs to consider various factors such as bandwidth (BW) of operation, number of transmit and receive chains it can support, and a wide variety of other factors. Described in the present patent documents are embodiments of architecture with unified components to allow simultaneous transmission and reception of different rats using unified hardware.

Figure 2:
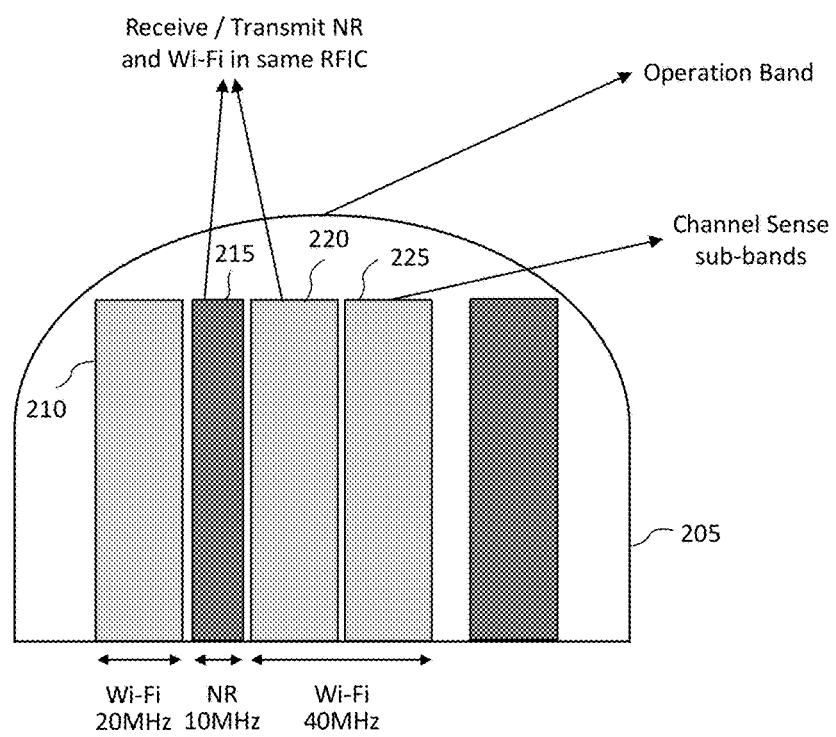
FIG. 2 graphically depicts spectrum of wireless signals with different RATs, according to embodiments of the present disclosure.

As shown in FIG. 2, wireless signals with different RATs may be within an operation bandwidth 205 in a unified hardware. The wireless signals may comprise a first Wi-Fi signal 210 using 20 MHz bandwidth, a 5G NR signal 215 using 10 MHz, a second Wi-Fi signal 220 and a third Wi-Fi signal 225 using 20 MHz bandwidth together, etc. The transmitting and receiving chain may be configured to be operated in various configurations, such as four transmitting with four receiving or two transmitting with four receiving, etc. The unified HW may support simultaneous operation of different RATs, e.g., the 5G NR signal 215 and the Wi-Fi signal 220 in a radio frequency integrated circuit (RFIC) interface as shown in FIG. 2, or NR and 4G LTE, 4G LET and Wi-Fi, etc.

One skilled in the art shall understand that the term wireless standards or RATs may be referred as different types of wireless communication technologies, e.g., 5G NR, 4G LTE, Wi-Fi, etc. the wireless standard may be referred as different versions of one type wireless communication, e.g., 5G Wi-Fi, Wi-Fi 4 (wireless-N), Wi-Fi 5 (wireless-AC), Wi-Fi 6 (AX Wi-Fi), etc.

Figure 3A:
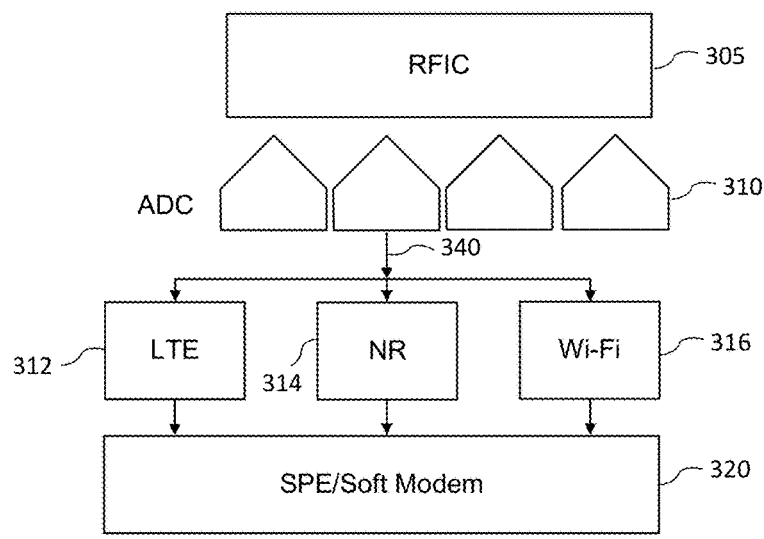
FIG. 3A depicts aggregation of signal of multiple radio access technologies (RATs) in receiving direction using a single radio frequency integrated circuit (RFIC) interface, according to embodiments of the present disclosure.
Figure 3B:
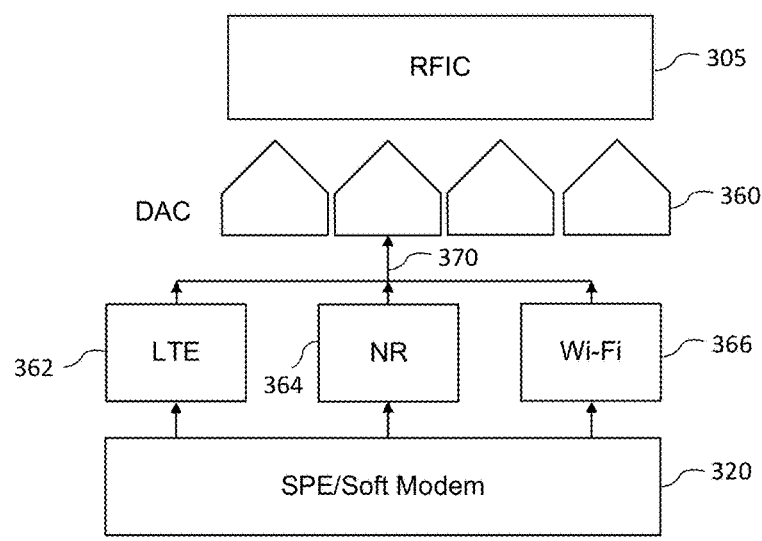
FIG. 3B depicts aggregation of signal of multiple radio access technologies (RATs) in transmitting direction using a single radio frequency integrated circuit (RFIC) interface, according to embodiments of the present disclosure.

Traditional transceivers may need to operate alternatively for transmitting and receiving information over the same frequency, or to operate on different frequencies under the same RAT (e.g., LTE) if a user wishes to transmit and receive information at the same time. While in embodiments of the present disclosure, the unified HW may aggregate wireless signals of different RATs in transmitting and receiving directions using a single RFIC interface 305 as shown in FIG. 3A and FIG. 3B respectively. The single RFIC interface 305 may comprise multiple antennas for wireless signal transmitting and receiving. The single RFIC interface 305 couples to multiple analog-to-digital converters (ADCs) 310 (as shown in FIG. 3A) for signal receiving or digital-to-analog converters (DACs) 360 (as shown in FIG. 3B) for signal transmitting. In the signal receiving direction, output from each antenna in the RFIC interface 305 may be converted using a single ADC (preferably a wideband ADC) to a digital signal 340, which may then be disaggregated, at the programmable baseband, into signals of different standards, e.g., a Long-Term Evolution (LTE) signal 312, a 5G NR signal 314, and/or a Wi-Fi signal 316, etc. These disaggregated signals are then transmitted to a signal processing engine (SPE) 320 for post-processing respectively.

In the signal transmitting direction, signals of different standards, e.g., a Long-Term Evolution (LTE) signal 312, a 5G NR signal 314, and/or a Wi-Fi signal 316, etc., are aggregated into an aggregated digital signal 370. Signals of different standards may be contiguous or non-contiguous in frequency within the aggregated digital signal 370. The aggregation may be achieved, at a programmable baseband comprising a sample processing unit (SPU), by digitally mixing the composite signal containing multiple carriers and filtering out the adjacent carriers in such a way that there is zero or minimal impact to the desired carrier.

Figure 4:
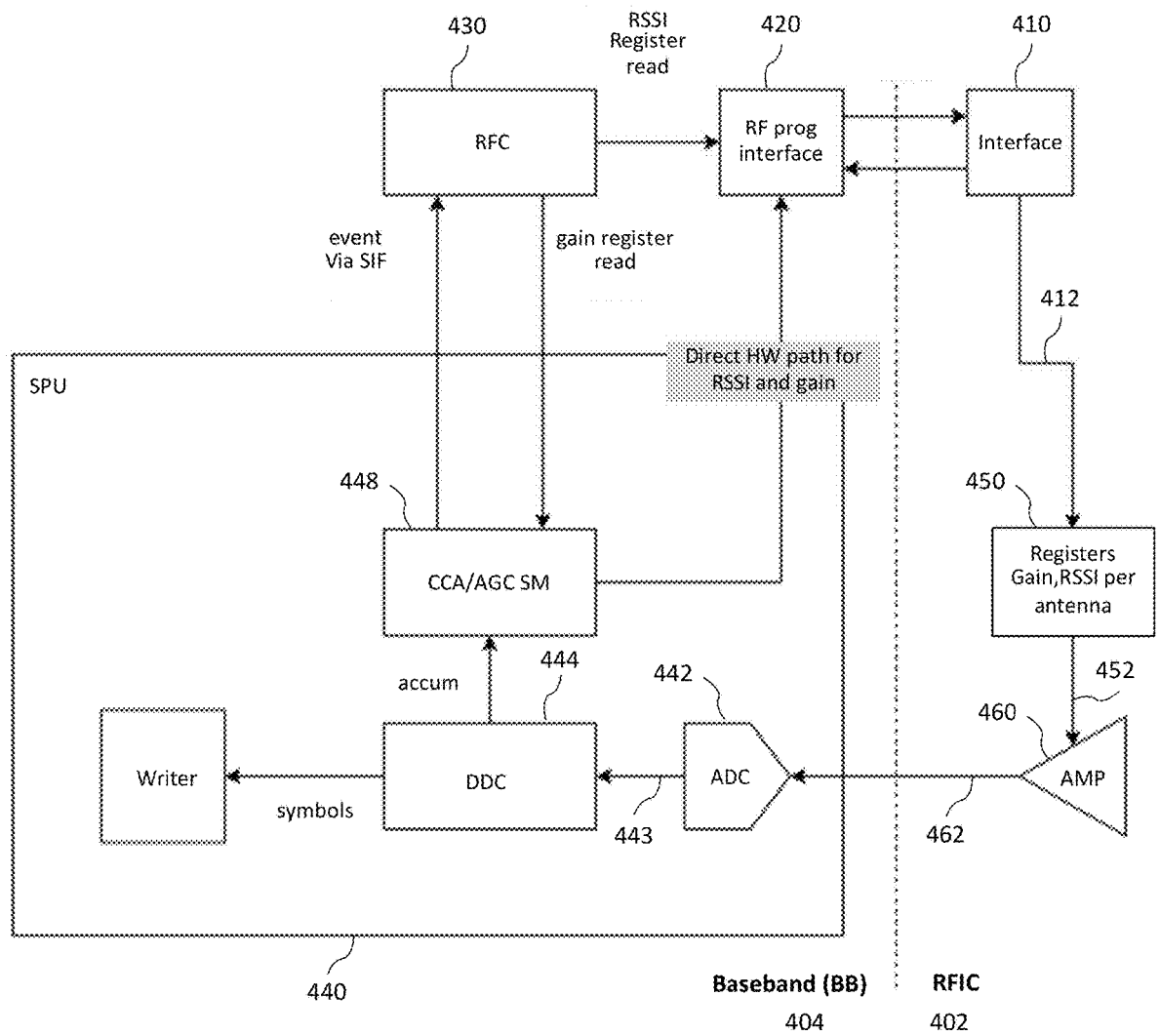
FIG. 4 depicts unified signal processing system with support for automatic gain control (AGC) and an RFIC interface, according to embodiments of the present disclosure.

In one or more embodiments, the digital signal may be disaggregated into signals of different standards by multiple frequency shifters operating in parallel and independently. Each frequency shifter may be configured or programmed to output a signal at a desired frequency band. Similarly, signals of different standards may be aggregated by multiple frequency shifters FIG. 4 depicts unified signal processing system with support for automatic gain control (AGC) and an RFIC interface, according to embodiments of the present disclosure. The unified hardware comprises a baseband (BB) 404 and a RFIC 402. The RFIC 402 comprises an RFIC interface 410 for wireless signal transmitting and receiving, a signal detection module 450, and an amplifier 460. The BB 404 comprises a SPU 440, an RF controller (RFC) 430, and an RF programming interface 420. The RFC may program the RFIC interface 410, via the RF programming interface 420, for performing desired RF signal transmission and/or receiving operation.

The signal detection module 450 performs one or more measurements for the received RF signal 412 to measure one or more parameters 452 such as register gains and/or received signal strength indicator (RSSI) per antenna for one or more frequency bands. The amplifier 460 amplifies the received RF signal 412 based on the measured one or more parameters 452 to output an amplified signal 462, which is then converted by an ADC 442 into a digital signal 443.

The digital signal 443 is processed by a digital down converter (DDC) unit 444, which comprises multiple DDCs with each DDC having respective mixer and filter for independent operation. The digital signal 443 may be disaggregated in the DDC unit 444 into different outputs corresponding to different RATs. Output from each DDC in the DDB unit 444 are accumulatively fed into an automatic gain control (AGC) unit 448 for gain control. The AGC unit 448 may also implement clear channel assessment (CCA) to determine if one or more RF bands are busy or not in use. Parameters for gains applied to each DDC output may be read by the AGC unit 448 from the RFC 430. On the other hand, outputs from the AGC unit 448 may be sent to the RFC 430, and/or sent to the RF programming interface 420 via direct hardware path for RSSI and gain programming.

The baseband may be operated to support AGC control with a convergence range, e.g., over 70 dB, in a short interval, e.g., less than 2.4 µs, for a fast path to RFIC for quick gain changes. The SPU may be operated for fast detection of Wi-Fi preamble to facilitate Wi-Fi receiving. Furthermore, measurements for channel sensing may be used to aid channel access which is critical for unlicensed mode of operation.

Figure 5:
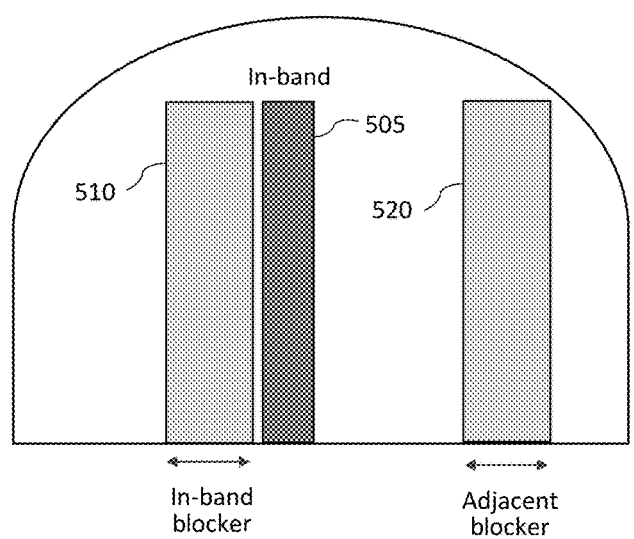
FIG. 5 graphically depicts adjacent channel blockers rejection, according to embodiments of the present disclosure.

In one or more embodiments, the unified signal processing system is capable of rejecting adjacent channel blockers, as shown in FIG. 5. An adjacent channel blocker 515 may be rejected or suppressed by the unified signal processing system. Furthermore, the effect of an in-band blocker 510 on a desired in-band signal 505 may be minimized during signal processing. The unified signal processing system may support power amplifier (PA) linearization across RATs without an explicit feedback path. The unified signal processing system may also support channel sensing in adjacent bands, which is highly critical for operation over unlicensed spectrum. While traditional PA implementations contain an explicit feedback path to estimate the PA characteristics, there is no need for such an explicit path in one or more embodiments of the present disclosure. Such a PA implementations without an explicit feedback path may save significant area on the SoC and also bring down the power dissipation considerably.

Figure 6A:
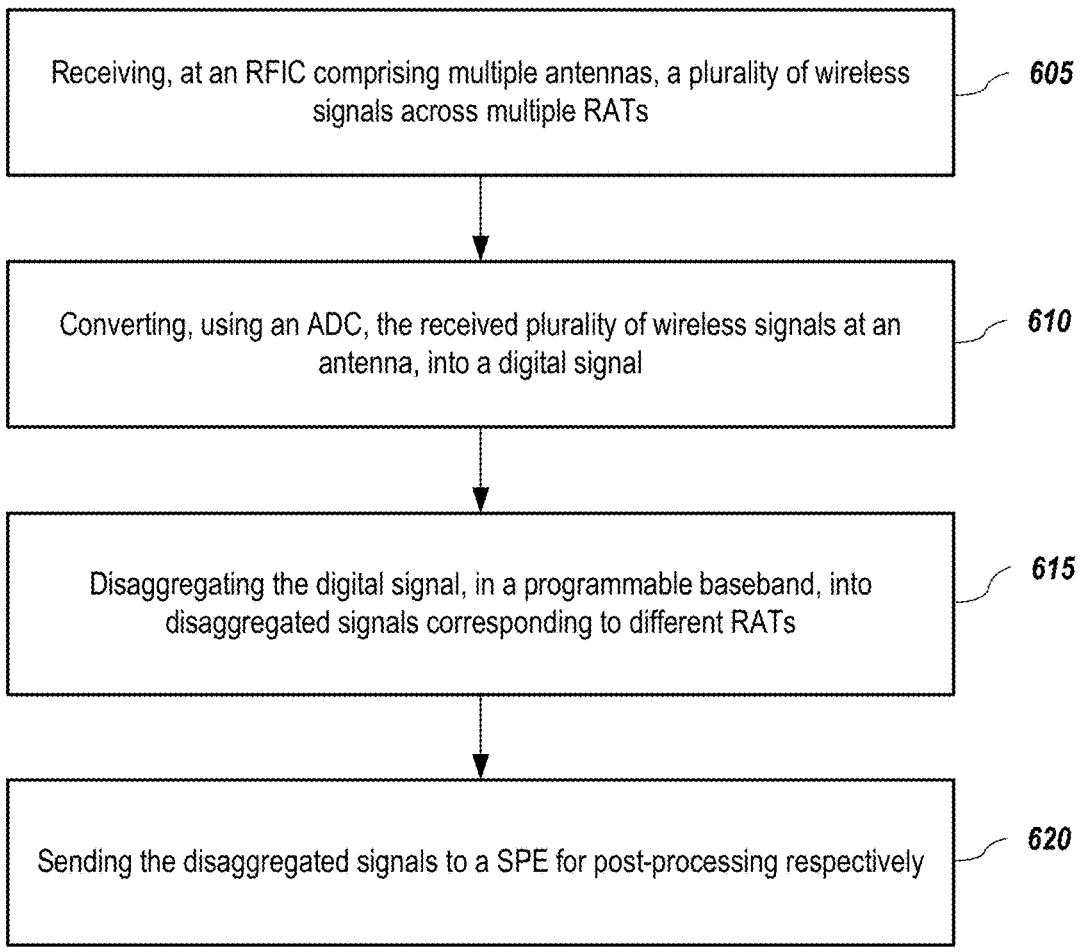
FIG. 6A depicts a method for processing received signals of different radio access technologies, according to embodiments of the present disclosure.

FIG. 6A depicts a method for processing received signals of different radio access technologies, according to embodiments of the present disclosure. In step 605, a signal processing system receives, in a receiving path, a plurality of wireless signals across multiple RATs, e.g., 5G, LTE, Wi-Fi, etc., at an RFIC comprising multiple antennas. Each of the plurality of wireless signals has a bandwidth within a receiving band of the RFIC. In step 610, the received plurality of wireless signals at an antenna are converted, using an ADC, into a digital signal. In step 615, the digital signal is disaggregated, in a programmable baseband, into disaggregated signals corresponding to different RATs. e.g., a LTE signal, a 5G NR signal, and/or a Wi-Fi signal, etc. In step 620, the disaggregated signals are then sent to a SPE for post-processing respectively.

Figure 6B:
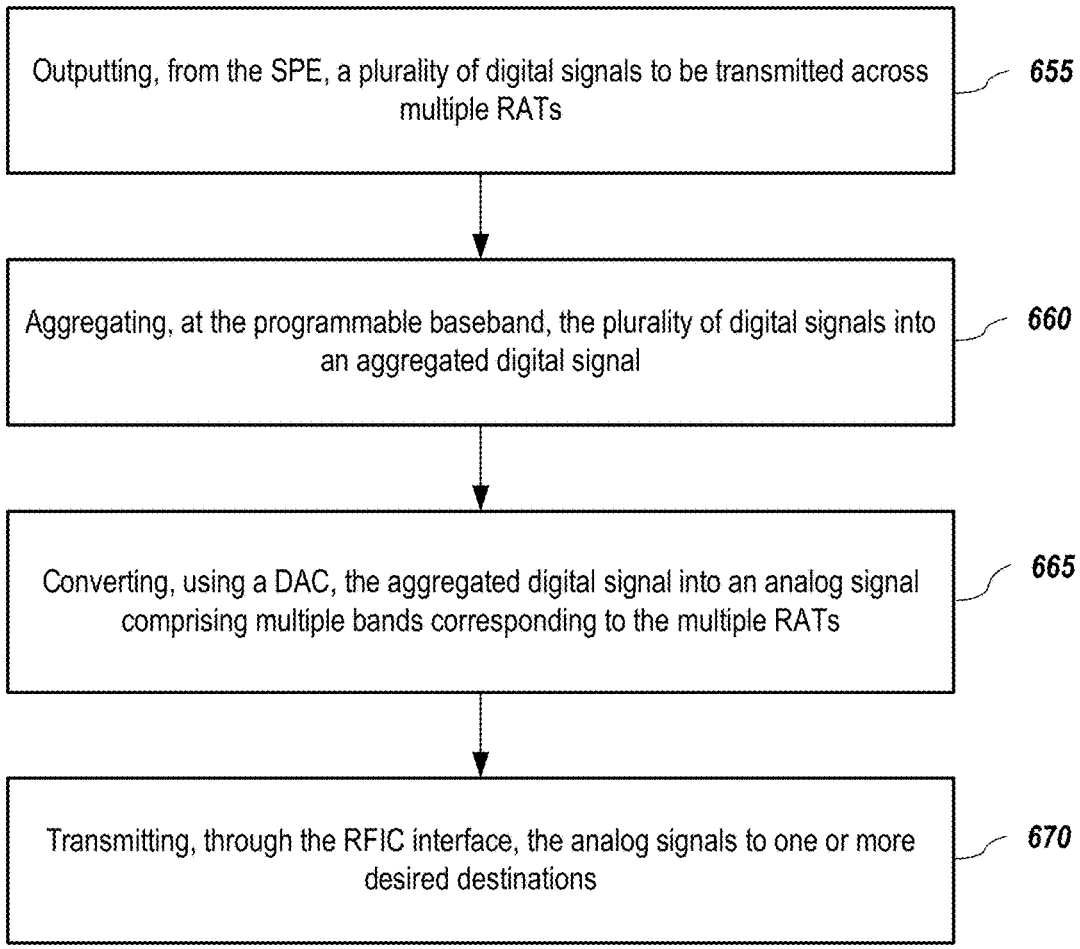
FIG. 6B depicts a method for transmitting signals of different radio access technologies, according to embodiments of the present disclosure.

FIG. 6B depicts a method for transmitting signals of different radio access technologies, according to embodiments of the present disclosure. In a transmitting path which may be simultaneous to the receiving path, a plurality of digital signals to be transmitted across multiple RATs, e.g., 5G, LTE, Wi-Fi, etc., are output from the SPE for transmission in step 655. In step 660, the plurality of digital signals are aggregated, at the programmable baseband, into an aggregated digital signal. The plurality of digital signals may be contiguous or non-contiguous in frequency within the aggregated digital signal. In step 665, the aggregated digital signal is converted, using a DAC, into an analog signal across multiple bands corresponding to the multiple RATs. In step 670, the analog signals are transmitted through the RFIC, to one or more desired destinations.

C. Embodiments of Signal Transmission Path

Figure 7:
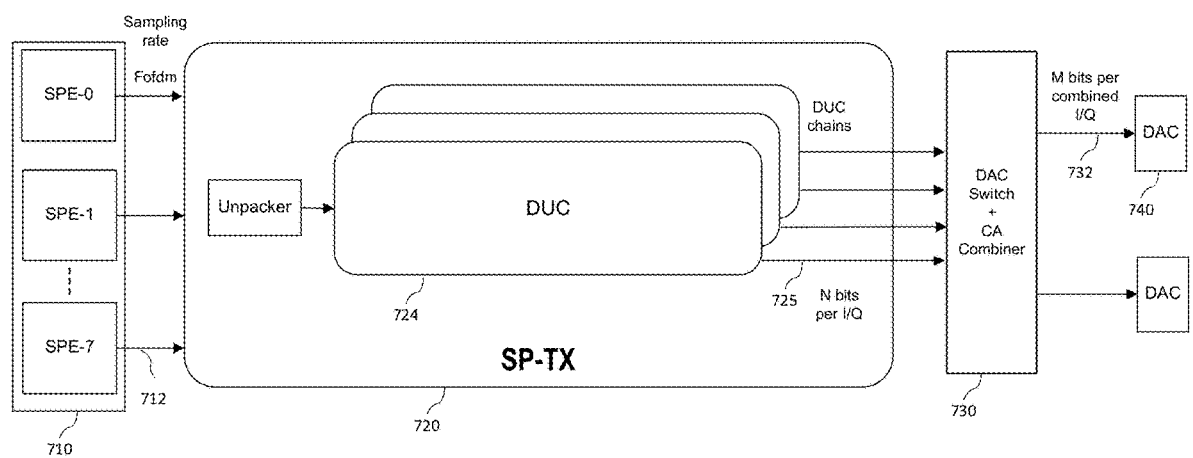
FIG. 7 depicts a schematic diagram of a sample processing unit (SPU) for processing signals across different wireless standards on a transmission path, according to embodiments of the present disclosure.

FIG. 7 depicts a schematic diagram of an SPU for processing signals across different wireless standards on a transmission path, according to embodiments of the present disclosure. As shown in FIG. 7, the SPU 720 samples outputs from an SPE 710 comprising multiple SPE units at a sampling rate ($F_{ofdm}$) of orthogonal frequency division multiplexing (OFDM). The SPE outputs may comprise multiple signals at baseband spectrum. A digital up converter (DUC) chain comprising multiple DUCs 724 processes the SPE outputs by translating the SPE outputs from baseband spectrum to multiple signals 725 at various intermediate frequency (IF) bands. Each of the IF signals may correspond to a respective carrier or a wireless stand. The IF signals are then aggregated, at a carrier aggregation (CA) combiner 730, into an aggregated signal 732, which is output to a desired DAC 740, through a DAC switch, for digital-to-analog conversion. The analog signal is then transmitted through an RFIC interface (not shown in FIG. 7). The CA combiner 730 and the DAC switch may be integrated together.

Figure 8:
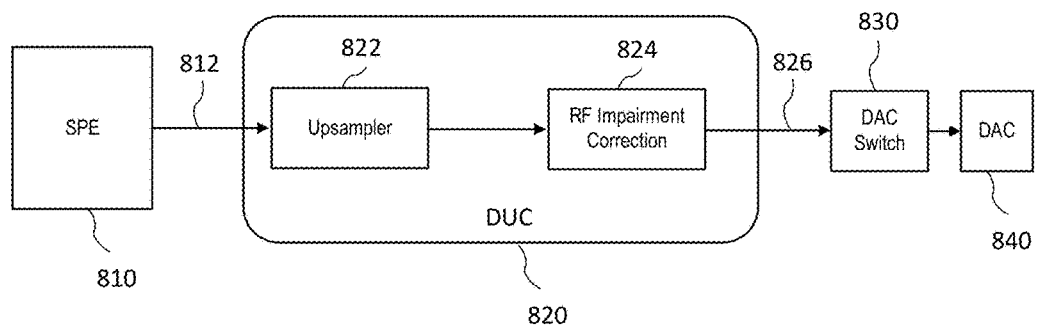
FIG. 8 depicts a block diagram on a transmission path for processing signals across different wireless standards, according to embodiments of the present disclosure.

FIG. 8 depicts a block diagram on a transmission path for processing signals across different wireless standards, according to embodiments of the present disclosure. One baseband signal 812 output from a SPE 810 is sent to a DUC 820 for multiple stages of signal processing to generate a digital output signal 826. Those stages may comprise an upsampler stage 822 and an RF impairment correction stage 824. The upsampler stage 822 may use one or more mixers or filters (e.g., the high-pass filter, low-pass filter, etc.) desired upsampling processing. The RF impairment correction stage 824 may perform one or more operations, e.g., DC offset compensation, for desired RF impairment correction. The digital output signal 826 is then forwarded, via a DAC switch 830, to a desired DAC 840 for analog signal conversion.

Figure 9:
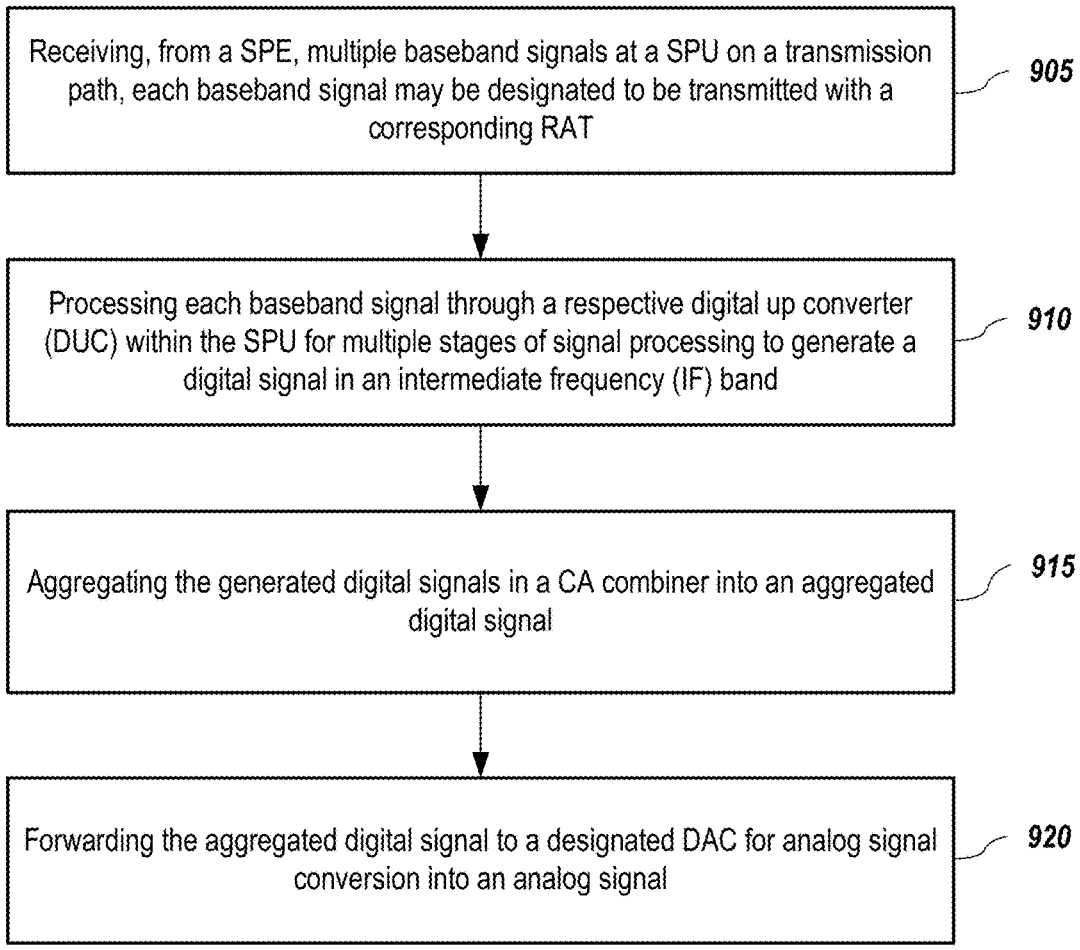
FIG. 9 depicts a process for processing signals on a transmission path across different wireless standards, according to embodiments of the present disclosure.

FIG. 9 depicts a process for processing signals on a transmission path across different wireless standards, according to embodiments of the present disclosure. In step 905, multiple baseband signals from a SPE are received at a SPU on a transmission path. Each baseband signal may be designated to be transmitted with a corresponding RAT. In step 910, each baseband signal is processed through a respective digital up converter (DUC) within the SPU for multiple stages of signal processing to generate a digital signal in an intermediate frequency (IF) band. In step 915, the generated digital signals are aggregated in a CA combiner into an aggregated digital signal. The plurality of digital signals may be contiguous or non-contiguous in frequency within the aggregated digital signal. In step 920, the aggregated digital signal is forwarded, via a DAC switch, to a designated DAC for analog signal conversion into an analog signal, which may comprise multiple sub-bands corresponding to multiple RATs.

D. Embodiments of Signal Receiving Path

Described in this section are embodiments of a signal receiving path to process signals across multiple RATs. Components in a signal receiving path may be integrated together with components in a signal transmission path within one or more processors, units, or within one SoC. One or more processes for signal receiving may be implemented simultaneously with one or more processes for signal transmitting. Furthermore, the signal receiving path may be operated independently from the signal transmitting path.

Figure 10:
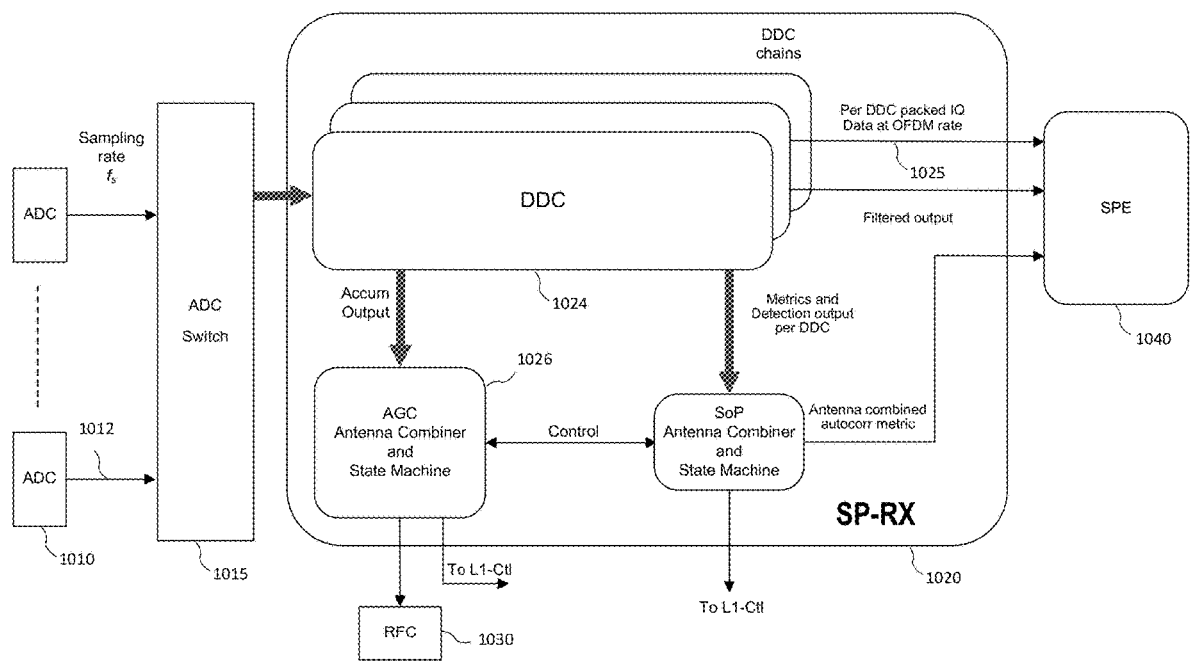
FIG. 10 depicts a schematic diagram of a SPU for processing signals across different wireless standards on a receiving path, according to embodiments of the present disclosure.

FIG. 10 depicts a schematic diagram of an SPU for processing signals across different wireless standards on a transmission path, according to embodiments of the present disclosure. As shown in FIG. 10, an ADC switch 1015 couples to multiple ADCs 1010, with each ADC used to convert an analog signal received at one antenna. The analog signal may comprise multiple signals at various sub-bands corresponding to different RATs, e.g., 5G and Wi-Fi, etc. The ADC switch 1015 switchably forwards an ADC output 1012 from one ADC to one or more digital down converters (DDCs) 1024 within a SPU 1020. Each DDC has respective mixer and filter for independent and parallel operation. The ADC output 1012 may be disaggregated, via the one or more DDCs, into different DDC outputs 1025 corresponding to different RATs. The DDC outputs 1025 are then sent into a SPE for baseband processing. Outputs from each DDC are accumulatively fed into an AGC unit 1026 for gain control. The AGC unit 1026 may also implement clear channel assessment (CCA) to determine if one or more RF bands are busy or not in use. Outputs from the AGC unit 1026 may be sent to an RF controller (RFC) 1030 for RF planning.

Figure 11:
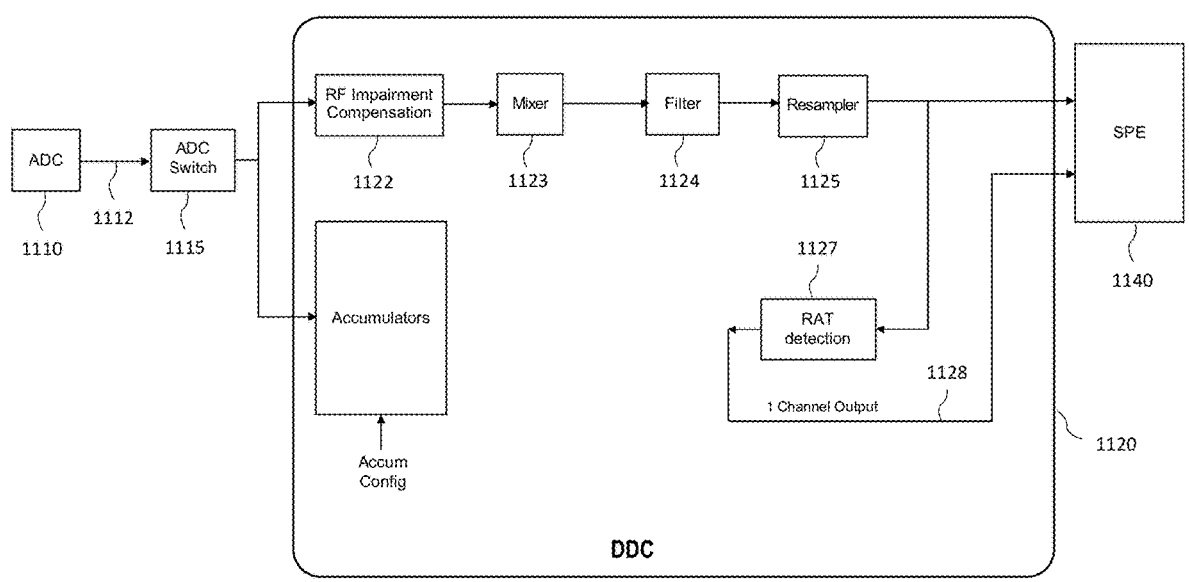
FIG. 11 depicts a block diagram on a receiving path for processing signals across different wireless standards, according to embodiments of the present disclosure.

FIG. 11 depicts a block diagram on a receiving path for processing signals across different wireless standards, according to embodiments of the present disclosure. An ADC output 1112 from an ADC 1112 is switchably forwarded by an ADC switch 1015 to a DDC 1120 within a SPU for multiple stages of signal processing. Those stages may comprise an RF impairment compensation stage 1122, a mixer 824 for desired frequency downshifting, a filtering stage 1124 with one or more filters (e.g., the high-pass filter, low-pass filter), and a resampling stage 1125. The DDC output signal is then sent into a SPE 1140 for further processing.

In one or more embodiments, the DDC 1120 may further comprise a RAT detection unit 1127 to perform a RAT or a wireless standard specific detection operation, which may comprise a detection of presence or absence of any signal of the wireless signal. The detection operation may involve detection of a signature (e.g., a preamble for a Wi-Fi signal, or a cyclic prefix (CP) for a 5G NR signal) that is specific to a wireless standard. For example, the RAT detection unit 1127 may be configured for performing Wi-Fi preamble or 5G NR CP detection to generate a detection output 1128, which indicates whether there is a presence or absence of Wi-Fi or 5G NR signal in the wireless signal received at the RFIC. The detection output 1128 is sent to the SPE for the SPE to process the DDC output signal accordingly.

Figure 12:
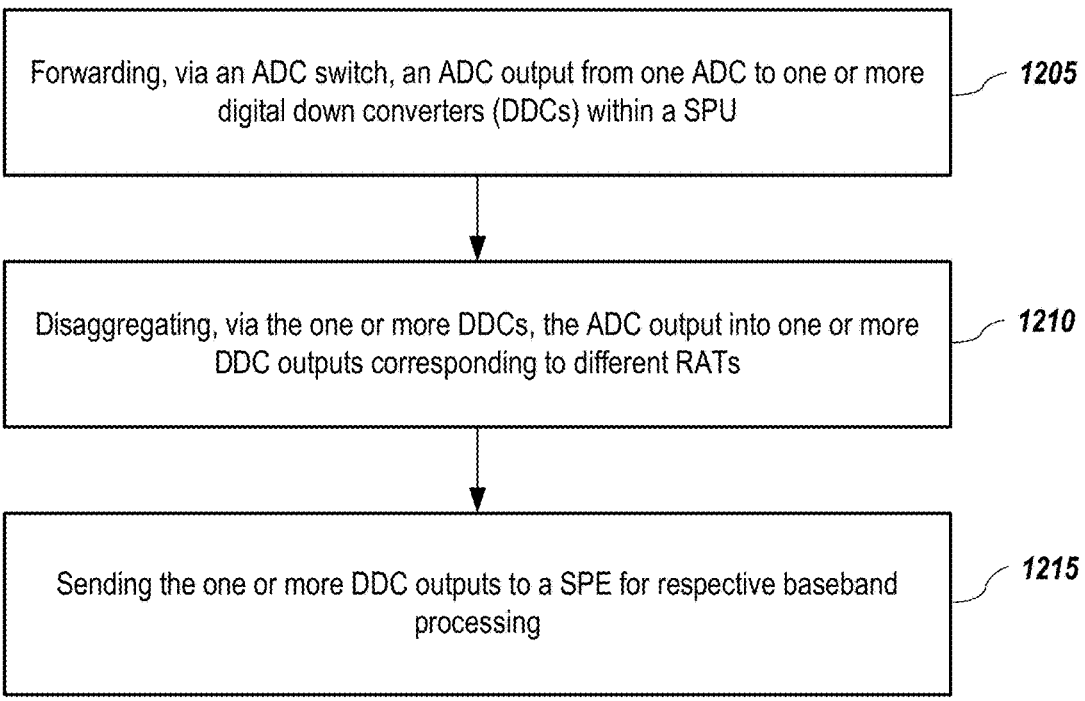
FIG. 12 depicts a process for processing signals on a receiving path across different wireless standards, according to embodiments of the present disclosure.

FIG. 12 depicts a process for processing signals on a receiving path across different wireless standards, according to embodiments of the present disclosure. In step 1205, an ADC output from one ADC is forwarded, via an ADC switch, to one or more digital down converters (DDCs) within a SPU. The ADC output is converted from an analog signal comprising multiple signals at various sub-bands corresponding to different RATs, e.g., 5G and Wi-Fi, etc. In step 1210, the ADC output is disaggregated, via the one or more DDCs, into one or more DDC outputs corresponding to different RATs. The ADC output has multiple stages of signal processing in each DDC for the generation of a corresponding DDC output. Each DDC may also comprise a RAT detection unit to perform a RAT or a wireless standard specific detection operation. In step 1215, the one or more DDC outputs are sent to a SPE for respective baseband processing. In one or more embodiments, each DDC output may be sent together with a corresponding wireless standard detection result to the SPE for signal processing accordingly.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for signal processing across wireless standards comprising:
   receiving, at a radio frequency integrated circuit (RFIC) interface, a plurality of wireless signals across multiple wireless standards;
   converting, using an analog-to-digital converter (ADC), the received plurality of wireless signals, into a digital signal;
   disaggregating, in a signal receiving direction within a sampling processing unit (SPU), the digital signal into disaggregated signals corresponding to different wireless standards;
   sending the disaggregated signals to a signal processing engine (SPE) for post-processing respectively;
   outputting, from the SPE, multiple digital signals to be transmitted across multiple wireless standards;
   aggregating, in a signal transmitting direction within the SPU, the multiple digital signals into an aggregated digital signal;
   converting, using a digital-to-analog converter (DAC), the aggregated digital signal into an analog signal across multiple bands corresponding to the multiple wireless standards; and
   transmitting, via the RFIC interface, the analog signal to one or more desired destinations.

2. The method of claim 1 wherein the signal transmitting direction and the signal receiving direction are enabled simultaneously.

3. The method of claim 1 wherein the multiple wireless standards comprise standards among a group of at least 5G new radio (NR), Long Term Evolution (LTE), and Wi-Fi.

4. The method of claim 1 wherein the SPU comprises multiple digital down converters (DDCs) to disaggregate the digital signal into disaggregated signals, each DDC implements multiple stages of signal processing to output a disaggregated signal.

5. The method of claim 4 wherein the multiple stages of signal processing by each DDC comprise one or more of:
   an RF impairment compensation stage;
   a mixer stage for desired frequency shifting;
   a filtering stage with one or more filters; and
   a resampling stage.

6. The method of claim 4 wherein each DDC further comprise a radio access technology (RAT) detection unit to perform a wireless standard specific detection operation and send a detection output to the SPE for the SPE to process the disaggregated signal accordingly.

7. The method of claim 1 wherein the multiple digital signals are contiguous or non-contiguous in frequency within the aggregated digital signal.

8. The method of claim 1 wherein the SPU comprises multiple digital up converters (DUCs) to aggregate the multiple digital signals into the aggregated digital signal, each DUC implements multiple stages of signal processing for a corresponding digital signal.

9. The method of claim 8 wherein the multiple stages of signal processing by each DUC comprise one or more of:
   an upsampler stage for desired upsampling processing; and
   an RF impairment compensation stage for desired RF impairment correction.

10. A system for wireless signal processing across wireless standards comprising:
   a signal processing engine (SPE) outputting multiple digital signals to be transmitted across multiple wireless standards;
   a sample processing unit (SPU) coupled to the SPE, the SPU comprises multiple digital down converters (DDCs) for signal processing in a signal receiving direction and multiple digital up converters (DUCs) for signal processing in a signal transmitting direction, the SPU receives the multiple digital signals from the SPE and aggregates, using the multiple DUCs, the multiple digital signals into an aggregated digital signal;
   a digital-to-analog converter (DAC) switchably coupled, via a DAC switch, to the SPU to convert the aggregated digital signal into an analog signal comprising multiple bands corresponding to the multiple wireless standards;
   a radio frequency integrated circuit (RFIC) interface comprising multiple antennas for wireless signal transmitting and receiving, the RFIC couples to the DAC to transmit the analog signal; and
   an analog-to-digital converter (ADC) switchably coupled to the SPU via a ADC switch, the ADC converts a plurality wireless signals across multiple wireless standards received at one antenna into a digital signal, the digital signal is disaggregated, using the multiple DDCs, into disaggregated signals corresponding to different wireless standards.

11. The system of claim 10 wherein each DDC implements multiple stages of signal processing to output a disaggregated signal, the disaggregated signals are sent to the SPE for further processing.

12. The system of claim 11 wherein each DDC further comprise a radio access technology (RAT) detection unit to perform a wireless standard specific detection operation and send a detection output to the SPE for the SPE to process the disaggregated signal accordingly.

13. The system of claim 10 wherein the multiple digital signals are contiguous or non-contiguous in frequency within the aggregated digital signal.

14. The system of claim 10 wherein the SPU further comprises an automatic gain control (AGC) unit coupled to the multiple DDCs for gain control, the AGC unit implements clear channel assessment (CCA) for the plurality wireless signals to determine if one or more RF bands are busy or not in use.

15. A circuit for signal processing across wireless standards comprising:
   a plurality of digital down converters (DDCs) for signal processing in a signal receiving direction, the plurality of DDCs receives a digital signal converted, by an analog-to-digital converter (ADC), from a wireless signal across multiple wireless standards received at an radio frequency integrated circuit (RFIC) interface, each DDC implements multiple stages of signal processing to output a disaggregated signal corresponding to one of the multiple wireless standards; and
   a plurality of digital up converters (DUCs) for signal processing in a signal transmitting direction; the circuit receives multiple digital signals from a signal processing engine (SPE) and aggregates, using the multiple DUCs, the multiple digital signals into an aggregated digital signal to be converted into an analog for transmitting by the RFIC interface, each DUC implements multiple stages of signal processing for a corresponding digital signal.

16. The circuit of claim 15 wherein the circuit is a sample processing unit (SPU).

17. The circuit of claim 15 wherein the SPU further comprises an automatic gain control (AGC) unit coupled to the plurality of DDCs for gain control, the AGC unit implements clear channel assessment (CCA) for the wireless signal to determine if one or more RF bands are busy or not in use.

18. The method of claim 15 wherein the multiple stages of signal processing by each DDC comprise one or more of:
   an RF impairment compensation stage;
   a mixer stage for desired frequency shifting;
   a filtering stage with one or more filters; and
   a resampling stage.

19. The method of claim 15 wherein the multiple stages of signal processing by each DUC comprise one or more of:
   an upsampler stage for desired upsampling processing; and
   an RF impairment compensation stage for desired RF impairment correction.

* * * * *